Nov. 26, 1968   M. JACOBS   3,412,483
DEVICE FOR REPRODUCING SOUND FROM A CARD SHAPED RECORD
Filed July 7, 1964   3 Sheets-Sheet 1
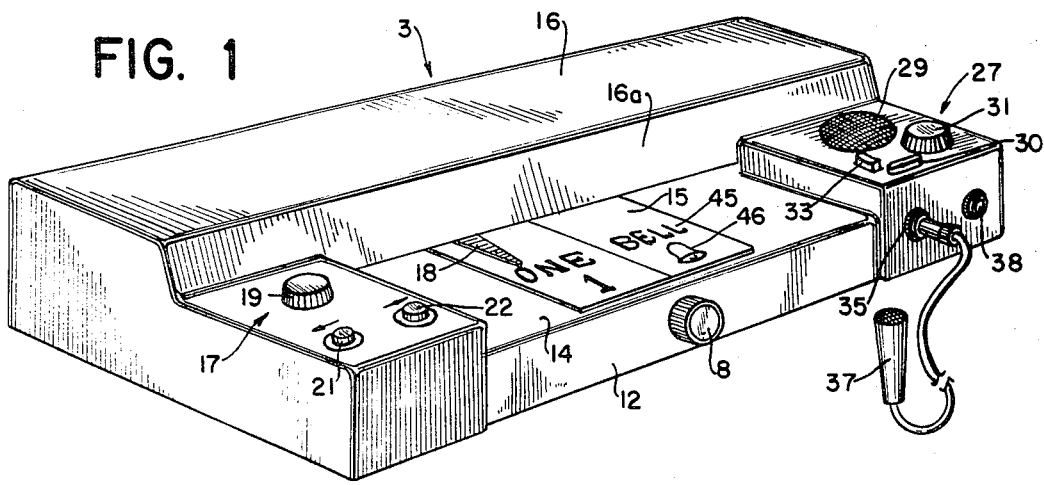
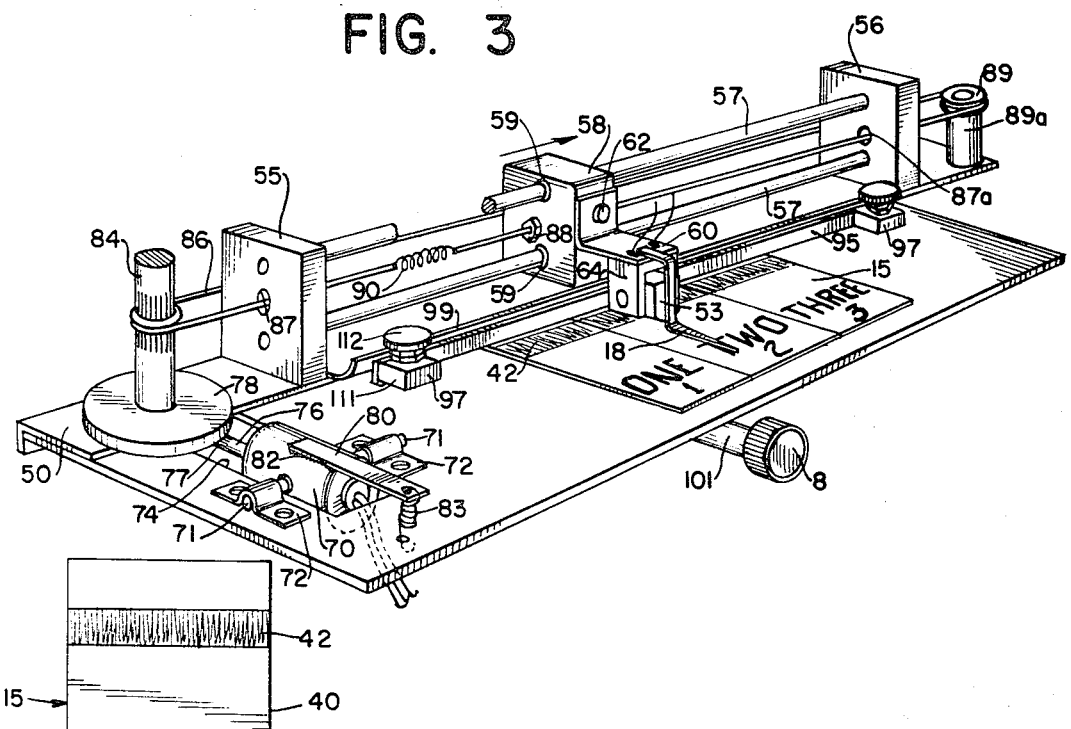
INVENTOR.
MARVIN JACOBS
BY Darby & Darby
ATTORNEYS

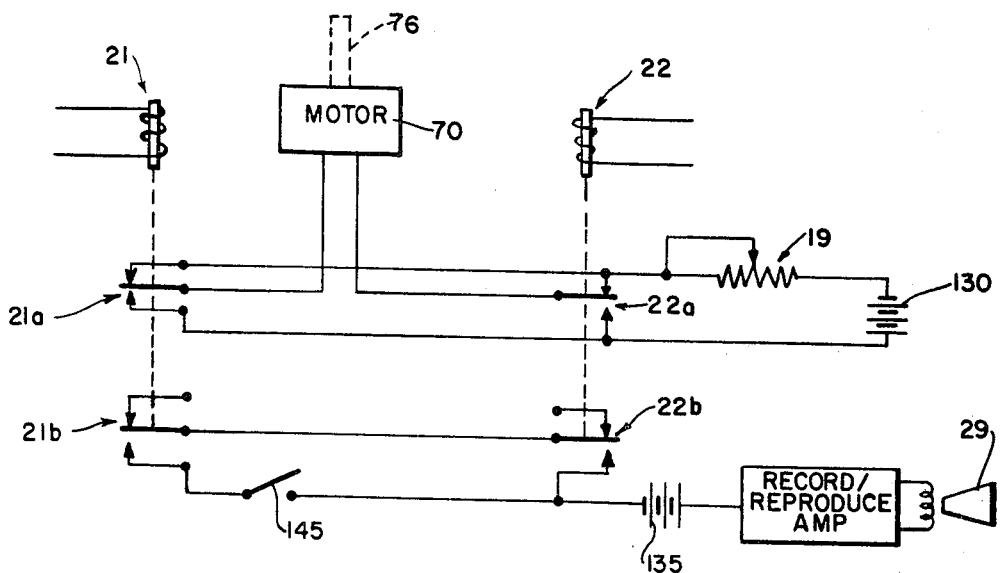
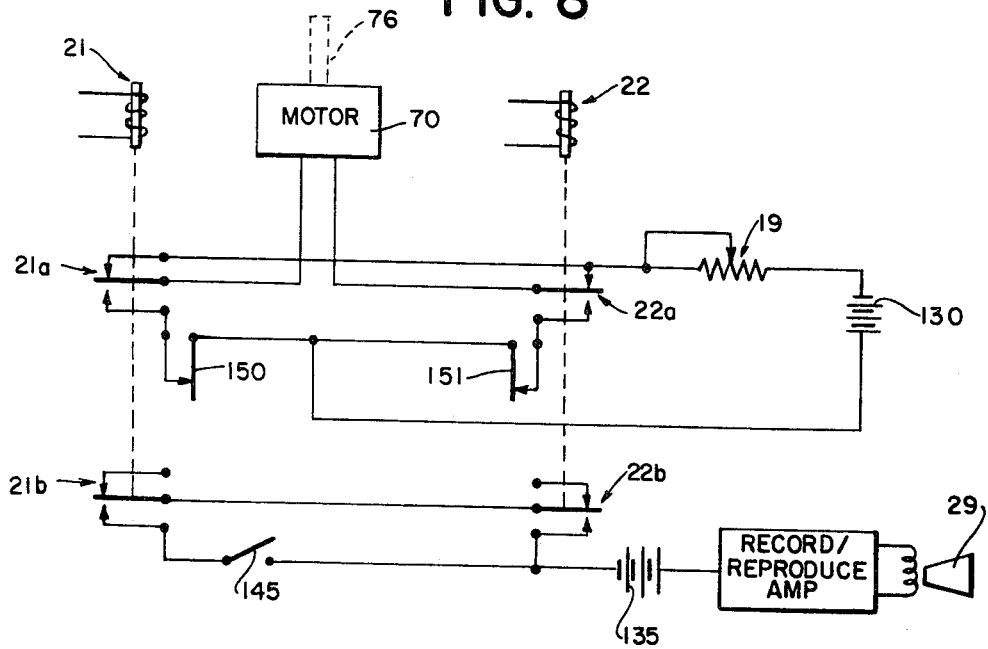

United States Patent Office 3,412,483
Patented Nov. 26, 1968

3,412,483
DEVICE FOR REPRODUCING SOUND FROM
A CARD SHAPED RECORD
Marvin Jacobs, 37 Huckleberry Drive,
Norwalk, Conn. 06850
Filed July 7, 1964, Ser. No. 380,810
8 Claims. (Cl. 35—35)

ABSTRACT OF THE DISCLOSURE

An audio-visual device in which a plurality of cards each having an audio-sound track thereon are held on a platform with the respective sound tracks in registration with each other and with a pickup means. Relative movement is provided between the cards and the pickup means so that the sound information on the sound tracks is reproduced and an indicator is provided to point to indicia on the card corresponding to the sound being played.

This invention relates to an audio-visual machine for educational, amusement and other purposes and more particularly to a machine for recording information on and audibly reproducing information from a sound track located on a carrier card which may also bear a written and/or pictorial indication of the information to be reproduced.

The present invention is directed to a machine useful for educational or amusement purposes which provides the facility to record sound impressions corresponding to information on individual cards, blocks, or other similar carrier medium in the form of a sound track and then reproduce the recorded information from the sound track. The carrier cards may be used individually to produce single words or in groups to produce phrases, sentences and verbal word sequences, or other audio information such as musical notes, sound effects, sounds of animals, etc.

In accordance with the invention the machine, for performing these functions, generally comprises an electronic section including a magnetic recording-reproducing head for recording and/or reproducing information on a magnetic tape sound track; a platform and clamping mechanism for holding one or more cards in operative relationship with the magnetic head; a drive mechanism for moving or traversing the head over the sound tracks of the various cards; and a motor and control section for controlling the operation of the head drive mechanism. The parts selected for the various portions of the machine and the assembly thereof is carried out in a manner to provide a machine that is simple and substantially foolproof in its operation and relatively inexpensive to build.

It is therefore an object of the present invention to provide a machine for educational and amusement purposes that is capable of recording audio information on the sound track of a carrier card and then reproducing the information from one or more of these cards as individual words or groups of words.

Another object is to provide a machine for recording information on and reproducing information from a magnetic sound track located on a carrier card, which card may also have written or pictorial indicia thereon corresponding to the recorded information.

A further object is to provide a machine for recording and reproducing information on a carrier card magnetic sound track in which the machine holds the cards thereon by a readily actuated clamping mechanism and a magnetic recording-reproducing head mounted on a novel pivotal structure to assure good electrical cooperation with the sound track is traversed over the sound tracks of one or more cards.

Other objects and advantages of the present invention will become more apparent upon reference to the following specification and annexed drawings in which:

FIGURE 1 is a perspective view of a fully assembled machine in accordance with the present invention;

FIGURE 2 is a plan view of one of the cards carrying the sound track and indicia thereon;

FIGURE 3 is a perspective view showing the drive mechanism for the head and the platform for holding the cards;

FIGURES 7 and 8 are wiring diagrams for various portions of the motor control and electronic recording-reproducing sections.

Figure 4:
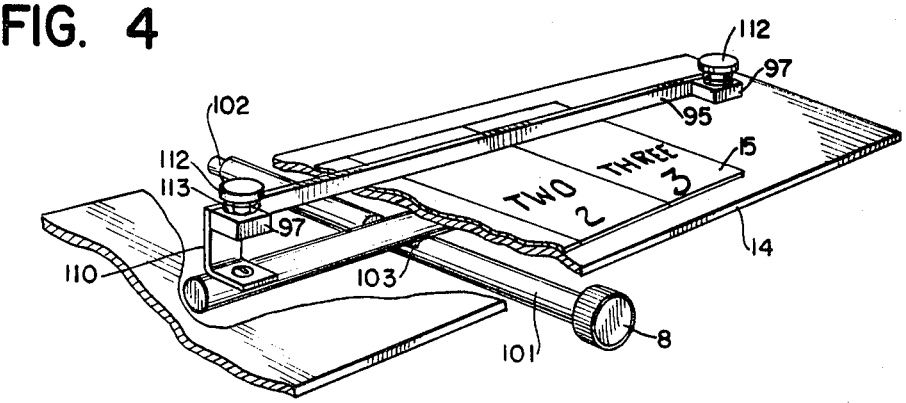
FIGURE 4 is a perspective view partially broken away showing the card holding platform and the clamping arrangement for holding the cards on the platform.

FIGURE 1 is an overall view of a machine 3 made in accordance with the invention. The various portions of the machine are described in greater detail below with reference to FIGS. 3–8. The major components of the machine 3 shown in FIG. 1 include a base member 12 on which is mounted a platform 14 for holding one or more cards 15 on which information is to be recorded or reproduced. The cards 15 are held to platform 14 by a clamping mechanism (not shown in FIG. 1) whose actuating knob 8 extends through the front of base 12. Turning knob 8 in one direction or the other either clamps the cards to the platform 14 or releases them from the platform.

Located at the one side of base 12 and raised from platform 14 is a compartment 17 which houses the motor (not shown in FIG. 1) for moving a recording and reproducing head (not shown in FIG. 1) substantially over the length of the platform between compartment 17 and a similar compartment 27 to traverse over the cards on the platform. Located on top of the compartment 17 is the knob 19 of a potentiometer control for varying the speed of the head drive motor and two push-button switches 21 and 22 which control the left and right traverse of the recorder-reproducer head. Each of the push buttons 21 and 22 controls the movement of the recorder-reproducer head in the direction shown by the respective adjacent arrow indicated on the top of compartment 17.

The second compartment 27 at the other end of the platform 14 contains the electronic reproducing-recording circuits and controls for the machine. This includes a suitable opening with grille member for a speaker 29 and a volume control 31 for controlling the output sound level of reproduction of information recorded on a card 15 as well as the input recording level. An earphone jack 38 for accommodating a single earphone or pair of earphones (not shown) provides listening facilities either in addition to those provided by the speaker 29 or else cuts out the speaker when an earphone is plugged in. As will be described below, when in record mode of operation, the earphone is used for monitoring the level of sound to be recorded. Also mounted on compartment 27 is a two-position slide switch 33 for changing the electronic circuits from the record to reproduce operating function, a microphone jack 35, and a microphone 37 for recording information on the cards 15 when switch 33 is in the record position. A small permanent magnet 30 is preferably cemented or otherwise held to the top of compartment 27 to facilitate its use for erasing information recorded on the magnetic sound track of the cards 15.

It should be understood that the various elements described as being contained within the respective compartments 17 and 27 may be interchanged as desired. For example, the motor control switches 21 and 22 may be located in the right hand compartment, to facilitate use by a right handed person. In this case, also, the less often used controls such as motor speed control 19 and volume control 31 may be mounted on the left compartment 17. Also, the various types of switches may be selected as desired so that switches 21 and 22 could be snap type switches and switch 33 of the push button type.

The drive mechanism for the head is in the upper portion of the machine and located under a covered section 16 whose front panel portion 16a is preferably made removable by the use of suitable fasteners to facilitate access to the drive mechanism so that it may be serviced or adjusted, if needed. The position of the recorder-reproducer head as it moves over the cards 15 is shown by a pointer 18 which moves along with the head.

FIGURE 2 shows one version of the general type of audio card which may be utilized with the present invention. The card includes a flat carrier member 40 of a suitable semi-rigid or rigid material such as stiff cardboard, molded or extruded plastic or nylon, etc. The carrier member 40 is provided with magnetic material which may be placed thereon in any desired manner, such as by coating directly onto the carrier or by the use of a strip of tape. In the embodiment of the invention described, a strip of magnetic tape 42 is affixed to the carrier 40, such as by a suitable adhesive, at a point spaced from the upper edge of the card. If desired, the area on the carrier member 40 for holding tape 42 may be recessed so that the tape will be flush with the top of member 40. Sound information may be recorded in a conventional manner on the strip of magnetic tape 42 and then reproduced therefrom. For the purposes of illustration the recorded information is considered to be the word "one." The word is displayed in written form and in pictorial form by the indicia 45 and 46.

If desired, the entire carrier member, including the magnetic tape strip 42, may be covered with a thin film of plastic material or formed of plastic material to make it waterproof and/or to permit writing thereon by a suitable type of pencil, such as a so-called grease or china marking pencil, which then may be erased. In the latter case, the indicia 45 and 46 would not necessarily be printed on the carrier 40 although some type of indicia may be located thereon. The carrier 40 is made as rigid as desired and its thickness is determined primarily by the clearance to be provided between the platform 14 and the head. This clearance is selected as a design specification for the machine and is then adhered to within certain tolerance limits. As will be described below, a novel mounting arrangement is used for the head to reduce the criticality of the clearance so that many types of cards of different thicknesses may be used.

FIGURE 3 is a perspective view of the machine with all of the cover members of FIG. 1 removed. Here, the flat platform member 14 is shown on which a plurality of cards 15 are held. A substantially flat and rigid base angle bracket 50 is secured to the rear of the platform by suitable means such as nuts and bolts or screws (not shown). Bracket 50 runs substantially along the entire length of platform 14 and has an overhanging portion at the end of the platform corresponding to compartment 27.

The major portion of the drive mechanism for the magnetic record-reproducer head 53 is situated on one side of the angle bracket base 50. This drive mechanism includes a pair of end supports 55 and 56 which hold two substantially rigid rods 57 therebetween. Rods 57 are preferably made of a suitable material, such as metal or fiber composition, so that a carriage block 58 holding the head 53 can move freely thereover. As shown, the carriage block 58 has a pair of "Oilite" collar bearings 59 to provide lubrication.

The reproducer-recorder head 53 is mounted to the carriage block by an angle bracket 60 fastened to block 58 by one or more suitable fastening members such as the rivet or screw 62. As shown, the pointer 18 is fastened to bracket 60 although it may be fastened to the casing of the head. The head 53 is also pivotally mounted for movement about a substantially horizontal axis, i.e., parallel to platform 14, by a pivot mounting 64 which is fastened to bracket 60. Various types of pivot mountings are described in detail below.

The angle bracket 60 is preferably made of spring stock material, or a more complex guide and spring arrangement may be used, to keep head 53 pressed gently against the upper surface of the magnetic tape 42 on the card. The pivotal mount 64 permits the head 53 to tilt from the front to rear of platform 14. This insures that when the head 53 is pressed against the surface of the tape the operating face of the tape is held flat and in proper position for effective recording and playback on tape 42. The pivotal mounting 64 is especially important since the ends of the cards 15 may warp somewhat, due to environmental causes, or the ends of the cards may be slightly bent as they are placed on the platform. The use of the resilient bracket 60 and the pivotal mounting 64 accommodates cards of different thicknesses and which may be slightly bent or warped in a manner such that the optimum operating relationship between the head 53 and the tape 42 is always achieved under a variety of operating conditions.

The drive mechanism for moving the carriage block 58 also includes a motor 70 having a pair of studs 71 fastened to the outer casing thereof. A portion of the motor extends through an opening 74 in the platform. The studs 71 are loosely held on the platform 14 within a pair of U-clamps 72 mounted on the platform.

Motor 70 has an output shaft 76 whose end 77 is used to drive the rim of a larger diameter speed reducing gear 78 which is mounted by suitable bearings (not shown) on the base angle bracket 50. A smaller diameter output wheel 84, with a portion of its surface knurled, is mounted on gear 78 for rotation therewith. The output end 77 of the shaft may be provided with a rubber bushing to engage the speed reducer gear 78 which may also be of rubber or some other suitable material. A support plate 80 is fastened to the outer casing of motor 70 by soldering or any other suitable technique at points 82 and one end of the support plate is biased by a spring 83. One end of the spring is connected to a hole in the support plate 80 while the other end is connected to the platform 14. By doing this the proper tension is provided so that motor output shaft 76 is in driving engagement with the speed reducing gears 78.

It should be understood that the speed reducing gear assembly may be of any suitable conventional form, for example, a gear train connected to the motor output shaft. This would eliminate the need for the motor tensioning arrangement.

A drive cable or belt 86 is wrapped for a few turns around the output wheel or gear 84 of the speed reducing assembly. One length of cable 86 passes through an opening 87 in the end support block 55 and is fixed to the carriage block 58 by a suitable fastener, such as the nut 88. The other length of the drive cable 86 passes outside the supports 55 and 56 and is looped around an idler pulley 89 rotatable on suitable bearings (not shown) located on a shaft support 89a which is mounted to the base angle bracket 50. From the pulley 89, the cable continues through an opening 87a in support 56 to the side of the carriage block 58 facing end support 56 and it is fastened to the carriage block by another suitable means, such as means 88.

A spring 90 connecting the separated ends of cable 86 and located between the carriage block and the support 55 provides tension for the cable. The spring 90 is preferably located at this position since it will stop the entire carriage block 58 from moving whenever the motor has traversed the carriage block to a position where the spring 90 abuts against end support 55.

It should be understood that the cable 86 may be made of any suitable material, for example, nylon or other fabric type cord, etc. If desired, the cable may also be a beaded chain or a rubber or fabric belt.

The audio cards 15 are held to platform 14 by a clamping bar 95 which is suspended between two spring loaded clamp end pieces 97. These are described in greater detail below. A rounded guide member 99, of suitable metal or plastic material, is also mounted on the base angle bracket 50 to provide a guide for the cards 15 as they are inserted into the machine so that they will go underneath the clamp bar 95.

The clamp bar structure is shown in greater detail in FIGURE 4. A roll 101 has one end connected to the control knob 8 which extends through the front of the base 12. This rod has a reduced diameter end 102 which is mounted within a suitable supporting structure (not shown) which extends downwardly from the lower rear surface of the platform 14 or from base angle bracket 50. The end 101 of reduced diameter is then pinned or held by a suitable washer on the other side of the supporting structure so that it can freely rotate therein but cannot pull out.

The rod 101 is formed with a groove or notch 103 therein at a point approximately beneath the clamp bar 95. Riding in this groove 103 is a rod or dowel 105 at whose ends are located the clamp bar end pieces 97.

Each of the clamp guide end pieces 97, has integrally connected thereto an L-shaped angle bracket 110 whose upper arm extends through an opening 111 in the platform 14 (see FIG. 3). The clamp bar 95 is held between the end pieces 97 and the upper arms of brackets 110. Each end piece 97 has an opening therein which is slidably mounted around a headed post 112 with a spring 113 positioned between the end piece 97 and the head of the post. The post 112 is fastened to the platform. In operation, as the control knob 8 is turned, the dowel 105 rides in the groove 103 or over the rounded portion of rod 101. In the former case, when the rod 105 is in the groove 103 the two brackets 110 are spring biased downwardly due to the action of the spring 113 and the clamp bar 95 is biased down against the platform 14. This will hold any cards 15 placed underneath the clamp bar. When the knob is turned so that the dowel 105 rides over the rounded portion of rod 100, then force is exerted through dowel 105 to raise the two angle brackets 110 thereby raising the clamp bar 95. This permits the cards to be removed or inserted from platform 14.

Figure 5:
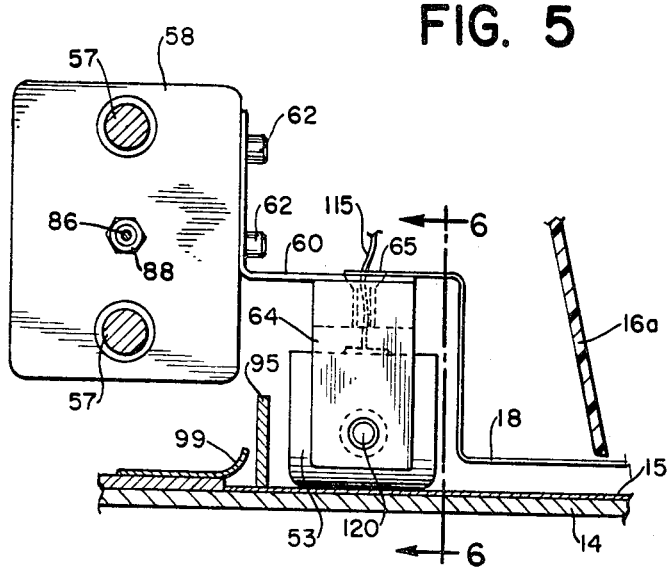
FIGURES 5 and 6 are side and front elevational views respectively of one arrangement for pivotally mounting the reproducing and recording head.
Figure 6:
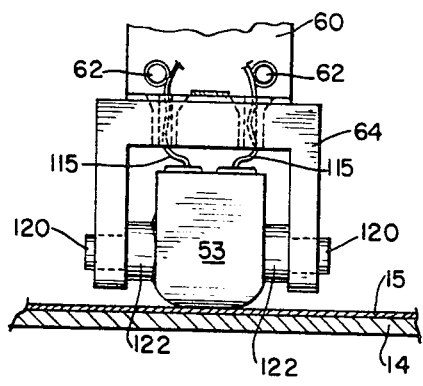

FIGURES 5 and 6 show one arrangement for mounting the recording reproducing head in the manner shown in FIGURE 3. Here, the bracket 60 is held to the carriage block 58 by a pair of fasteners 62. The U-shaped pivotal mounting 64 for the head 53 is held to the bracket 60 by fasteners such as screws 65 which may also hold the pointer 18. Alternatively, the pointer 60 may be separately fastened to the mounting support 64. One or more holes are made in the top of the mount 60 to permit passage of the wires 115 of the head therethrough.

Each arm of the lower end of the U-shaped mounting 64 has rivets or studs 120 mounted thereon. These studs form axles which ride in a socket 122 on each side of the head 53. Thus, the head 53 is free to tilt around the axis formed by members 120 and 122. At the same time, it is also biased by the resilient mounting bracket 60.

It should be understood that other arrangements are usable to mount the head 53. For example the bracket 60 can be made of rigid material and then the mount 64 held to this bracket by one or more springs to load the head against the card 15. The head is then pivotally mounted within the mount 64 in a manner similar to that described previously.

FIGURE 7 shows one form of switching arrangement for controlling the operation of the drive mechanism. Here the motor 70 is powered by a battery 130 which is connected in a selected manner to the motor to produce rotation of its output shaft 76 in one direction or the other. The switches 21 and 22 are in this case push button type switches having two decks of single pole, double throw contacts. The upper terminal of battery 130 is connected through the motor speed control rheostat 19 to the upper contacts of decks 21a and 22a. The center movable contact arms of decks 21a and 22a are connected to the two motor input leads. The lower stationary contacts of the two decks are connected to the lower terminal of the battery 130.

The lower decks 21b and 22b of the switch are used to control the supply voltage from a battery 135 to a recording and reproducing amplifier 140. The recording and reproducing amplifier 140 is of conventional construction and includes the volume control 29, the switch 33 for changing from a record to reproduce function, the microphone jack 35, and the auxiliary earphone jack 38. The leads to the recording head 53 are also connected to the amplifier 140 in the conventional manner. The output of the amplifier is the speaker 29. The amplifier and its associated components are of any suitable conventional construction, preferably of the transistorized type, a number of which are commercially available. The amplifier and its associated components in themselves are well known in the art and therefore not described or shown in detail.

In operation of the motor control circuit of FIGURE 7, depressing one or the other of switches 21 or 22 will apply voltage from battery 130 to the motor 70 of either positive or negative polarity. This will cause the motor to rotate in one direction or the other depending upon which of the two switches is depressed. If both switches 21 and 22 are depressed at the same time there will be no rotation of the motor since both motor input leads will be connected to the lower terminal of the battery.

At the same time that the switch 21 or 22 is depressed, the battery 135 is connected to the amplifier 140 through the lower switch deck thereby making it operative. Since the amplifier 140 is of transistorized construction no warmup time is needed.

A muting switch 145 is connected between the lower contact of switch 21b and the battery 135. Since this switch 145 is normally open there will be no voltage applied to the amplifier 140 when the head is traversing to the left, i.e., button 21 depressed. It is desirable in most cases that there be no reproduction of the sound from the cards 15 when the motor is traversing in a direction opposite to that of the magnetic recording pattern. The muting switch 145 is optionally provided to make the connection to apply power to amplifier 140 when the motor is traversed to the left. It should be understood that switch 145 can be installed either in the left or right motor switch 21 or 22 as desired in accordance with language application, i.e., in case the card is designed to reproduce the language as the head moves from right to left. If desired, the muting switch 145 may be eliminated entirely.

FIGURE 8 shows another type of circuit diagram. Similar reference numerals have been utilized for the same components as FIGURE 7. Two additional limit switches 150 and 151 are provided in the motor control circuit. These switches are positioned adjacent the compartments 17 and 27 of FIGURE 1 and are connected in the circuit to remove the power from the motor when the head approaches either one of the compartments. This prevents the head and other portions of the drive mechanism from being overdriven thereby preventing the drive mechanism and/or the head from getting out of line.

It should be understood that the switches 150 and 151 may be of any desired construction. For example, they could be reed type switches in which event a small magnet would be mounted on the carriage block 58 to actuate the switches when the block reached a suitable point during its traversal. Also, the switches 150 and 151 could be microswitches which are physically actuated by the carriage block. The switches 150 and 151 are not shown to avoid complicating the drawing.

From the circuits of FIGURES 7 and 8, it should be clear that there is no battery power consumed either by the motor or amplifier when the machine is inoperative. By this it is meant that the only time power is supplied from the motor battery 130 is when the motor is being traversed either to the left or right. When the muting switch 145 is used and the motor is traversed, power is supplied to the amplifier circuit only during one direction of traversal of the head. When switches 21 and 22 are depressed simultaneously, the motor 70 will not operate since both inputs to the motor are connected to the same side of the battery. However, in this case the amplifier is receiving power. This mode of operation is desirable since it enables the operator to adjust the recording level prior to making a recording simply by turning switch 33 to the record position, talking into microphones 37, listening at the earphone, and adjusting volume control 31.

The operation of the machine, as should be clear, is relatively simple. All that is necessary is to turn the clamp bar control 8 to raise the clamp bar and then insert one or more cards 15 under the pointer and under the guide rail 99. The control knob 8 is then turned to a position so that the clamp bar holds the cards 15 down against the platform 14. After this is done, the head 53 is traversed left, if needed, by pushing switch 21. The head would normally be located at a position to the left of the left-most card on the platform. The other switch 22 is then depressed which actuates the amplifier and traverses the head to the right. During the traversal the sounds recorded on the various cards 15 will be reproduced. It should be understood that the pointer 18 will indicate the position of the head 53 at all times. Thus, for example, when a plural syllable word is recorded on a card and the indicia 45 are broken up accordingly, the pointer will point to the syllable of the word being reproduced.

It should be understood that the machine of the present invention has many uses. For example, it can be used to teach small children and others how to read by reproducing letters, syllables or words corresponding to information printed on a card or cards 15. Also, when groups of cards are used entire sentences or phrases may be audibly reconstructed. The machine also has utility in teaching languages where a foreign language word is recorded on the card and the indicia corresponding to it is printed on the card. The machine may also be used for business applications to record data on individual cards, for music composition, i.e., to compose or reproduce music by inserting cards having musical notes thereon, for secret messages, etc.

The teaching aspects of the machine provide for positive teaching re-enforcement. By this it is meant that the operator of the machine both sees and hears the word at the same time. If desired, he may also see a picture corresponding to the word at the same time if the picture is printed on the card.

The machine also has applications for amusement use. For example, sounds of different animals can be recorded on the cards. Different types of sensible or nonsensical words, phrases or sentences may be constructed for amusement purposes, etc.

It should be understood that only a single type of card 15 has been shown and that other type cards may be used. For example, a card may be used which has a number of strips of magnetic tape 42 thereon together with space for indicia corresponding to the words on the individual tape strips. In this case, guide rail 99 is eliminated and a viewing window is placed on the platform to view a single word. Each of the multiple tape strip cards is aligned under the viewing window so that the word or number corresponding to the word on the particular type strip to be traversed by the head appears. A number of such cards could be utilized so that different word groupings and sentences can be constructed by using the same cards and shifting their positions with respect to the head.

It should also be understood that a single card 15 of the type shown in FIG. 2 may have a tape strip 42 located thereon at each edge of the card.

While preferred embodiments of the invention have been described above, it will be understood that these are illustrative only, and the invention is limited solely by the appended claims.

What is claimed is:

1. An audio signal machine comprising:
   at least one substantially flat carrier card having an elongated audio sound track recorded thereon,
   means including pickup means operative with said sound track on said card for reproducing the audio sound information recorded thereon,
   means including a platform for holding said card with the sound track thereon in registration with the pickup means,
   means for traversing said pickup means in two directions with respect to the card to reproduce the sound information recorded on said sound track during at least one direction of traversal,
   indicia on said carrier card for visually displaying the sound information recorded on said sound track, said indicia located on said carrier card in an elongated pattern and at predetermined positions corresponding to the audio sound information on the sound track with the length of the indicia pattern being proportional to the length of the corresponding sound information on the audio sound track,
   indicator means cooperating with the indicia on said carrier card for visually indicating the particular sound information being reproduced by said pickup means at a given time,
   and means for mounting said indicator means for movement with said pickup means.

2. An audio visual machine as in claim 1 wherein said holding means includes means for holding a plurality of said carrier cards on said platform in side-by-side relationship with the respective sound tracks thereon in registration with each other and the pickup means.

3. An audio-visual machine as set forth in claim 2 further comprising means for preventing the reproduction of the information obtained by said pickup means during one direction of traversal.

4. An audio-visual device of claim 2 wherein each of said carrier cards has a plurality of audio sound tracks thereon located in generally parallel spaced relationship.

5. An audio-visual machine as set forth in claim 2 wherein the holding means comprises means for clamping said cards to said platform, said clamping means including:
   (a) a clamp bar on top of said platform,
   (b) means for normally biasing said clamp bar to a first position for holding said cards,
   (c) and actuating means for moving said clamp bar to a second position wherein said cards may be inserted under said clamp bar or removed from said platform.

6. An audio-visual machine as set forth in claim 5 and further comprising a curved guide means adjacent said platform to guide the carrier cards into proper relationship with respect to said clamping means and said pickup means.

7. The audio-visual machine of claim 2 wherein the means for providing relative motion between the pickup means and the cards comprises:
(a) motor means having an output shaft rotatable in two directions,
(b) mounting means for holding said pickup means,
(c) and means connected between said motor means and said mounting means for driving said mounting means in a direction determined by the direction of rotation of said output shaft.

8. An audio-visual machine as set forth in claim 7 wherein said holding means for said pickup means comprises means for resiliently mounting said pickup means to urge it into an electrically operative relationship with the sound track on a respective carrier card and means for pivotally mounting said pickup means about an axis generally parallel to said sound track.

References Cited

UNITED STATES PATENTS

| | | | |
|---|---|---|---|
| 2,849,542 | 8/1958 | MacChesney | 179—100.2 |
| 3,145,268 | 8/1964 | Whitney et al. | 179—100.2 |
| 3,185,776 | 5/1965 | Bender | 179—100.2 |
| 3,163,819 | 12/1964 | Calhoun | 179—100.2 |

BERNARD KONICK, *Primary Examiner.*

J. R. GOUDEAU, *Assistant Examiner.*